United States Patent
Zahnow

(10) Patent No.: US 9,621,621 B2
(45) Date of Patent: Apr. 11, 2017

(54) SYSTEM, APPARATUS AND METHOD FOR ACTIVITY GUIDANCE AND MONITORING

(71) Applicant: Myron Frederick Zahnow, Plano, TX (US)

(72) Inventor: Myron Frederick Zahnow, Plano, TX (US)

(*) Notice: Subject to any disclaimer, the term of this patent is extended or adjusted under 35 U.S.C. 154(b) by 140 days.

(21) Appl. No.: 13/944,209

(22) Filed: Jul. 17, 2013

(65) Prior Publication Data

US 2014/0025785 A1 Jan. 23, 2014

Related U.S. Application Data

(60) Provisional application No. 61/672,619, filed on Jul. 17, 2012.

(51) Int. Cl.
| | |
|---|---|
| *G06F 15/16* | (2006.01) |
| *H04L 29/08* | (2006.01) |
| *H04W 4/20* | (2009.01) |
| *G06Q 10/06* | (2012.01) |
| *G07C 1/10* | (2006.01) |

(52) U.S. Cl.
CPC ............ *H04L 67/02* (2013.01); *G06Q 10/06* (2013.01); *G06Q 10/06398* (2013.01); *G07C 1/10* (2013.01); *H04L 67/025* (2013.01); *H04W 4/203* (2013.01)

(58) Field of Classification Search
CPC ....................................................... H04L 67/02
USPC .......................... 705/8, 32; 455/566; 709/219
See application file for complete search history.

(56) References Cited

U.S. PATENT DOCUMENTS

| | | | |
|---|---|---|---|
| 5,726,435 A | 3/1998 | Hara et al. | |
| 6,199,048 B1 | 3/2001 | Hudetz et al. | |
| 6,400,997 B1* | 6/2002 | Rapp, III | G06Q 10/063114 340/6.11 |
| 7,578,443 B1 | 8/2009 | Harris | |
| 8,131,597 B2 | 3/2012 | Hudetz et al. | |
| 8,141,783 B2 | 3/2012 | Harris | |
| 8,210,430 B1* | 7/2012 | Grant | G06Q 10/087 235/383 |

(Continued)

OTHER PUBLICATIONS

"JD Edwards EnterpriseOne Shop Floor Management 9.0 Implementation Guide", Sep. 2008, Oracle, pp. 1-308.*

(Continued)

*Primary Examiner* — Imad Hussain
(74) *Attorney, Agent, or Firm* — Hitchcock Evert LLP

(57) ABSTRACT

Embodiments of the present disclosure provide systems, apparatus and methods for activity guidance and monitoring utilizing a scanning device associated with a system network. Embodiments further disclose activity guidance and monitoring of labor workflow. The system may include a scanning device with a network communication component facilitating communication with a server. The scanning device may scan identification codes associated with a user or an activity, and display activity information based upon the scanned codes. The server may include a database of information related to the users and activities as well as historical information, and the server may provide analysis of such information. A user interface may facilitate activity status updates to be input into the system. Reports may be created to reflect the status updates or an analysis of the information.

20 Claims, 4 Drawing Sheets

(56) References Cited

U.S. PATENT DOCUMENTS

| | | | |
|---|---|---|---|
| 8,924,548 B2* | 12/2014 | Frost | G06Q 10/087 709/219 |
| 2002/0120493 A1* | 8/2002 | Mormile | G06Q 10/087 700/100 |
| 2002/0160817 A1* | 10/2002 | Salmimaa et al. | 455/566 |
| 2003/0148773 A1* | 8/2003 | Spriestersbach | G06Q 10/10 455/456.1 |
| 2003/0148775 A1* | 8/2003 | Spriestersbach | G06Q 10/10 455/456.1 |
| 2003/0208293 A1* | 11/2003 | Mountcastle, III | G05B 19/41865 700/96 |
| 2005/0040223 A1* | 2/2005 | Yigit | G06Q 10/06 235/376 |
| 2005/0120196 A1* | 6/2005 | Zito | 713/100 |
| 2006/0190391 A1 | 8/2006 | Cullen et al. | |
| 2007/0168488 A1 | 7/2007 | Deguchi et al. | |
| 2008/0172311 A1* | 7/2008 | Curran | 705/32 |
| 2009/0006164 A1* | 1/2009 | Kaiser et al. | 705/8 |
| 2009/0012813 A1 | 1/2009 | Berzansky et al. | |
| 2009/0132331 A1* | 5/2009 | Cartledge | G06Q 10/10 705/7.27 |
| 2009/0164238 A1 | 6/2009 | Auchinleck | |
| 2009/0244620 A1 | 10/2009 | Takahashi et al. | |
| 2010/0114780 A1 | 5/2010 | Tribe et al. | |
| 2010/0174581 A1* | 7/2010 | Mochizuki | G06Q 10/06 705/7.15 |
| 2011/0276886 A1* | 11/2011 | Hall | G06Q 10/06 715/734 |
| 2012/0108337 A1 | 5/2012 | Kelly et al. | |
| 2012/0134548 A1 | 5/2012 | Rhoads et al. | |
| 2012/0208592 A1* | 8/2012 | Davis | H04W 4/001 455/556.1 |
| 2013/0048710 A1* | 2/2013 | Marsico | G06F 17/30879 235/375 |
| 2013/0062402 A1* | 3/2013 | Cok | G06K 7/10792 235/375 |
| 2013/0332323 A1* | 12/2013 | Phillips et al. | 705/28 |

OTHER PUBLICATIONS

Unknown User. "Creating a Sub-Task". JIRA 5.2 Documentation. Apr. 29, 2012. pp. 1-3.*

Numbercruncher.com. "Creating a New Work Order". Jun. 25, 2009. pp. 1-3.*

PCT International Search Report mailed on Mar. 6, 2014 for PCT/US2013/050851, 13 pages.

Wallace, P., The Use of QR Codes for Document Management in Safety-Critical Industries, The University of Bath, Department of Mechanical Engineering [online] Apr. 19, 2011 (Apr. 19, 2011). [Retrieved on Dec. 19, 2013) Dec. 19, 2013)]. Retrieved from: <http://www.qrproject.com/project/ME40321%20-%20Paul%20Wallace%20-%20The%20Use%20of%20QR%20Codes%20for%20Dcoument%20Management%20in%20Safety-Critical%20Industries.pdf> p. ii-120.

Del Mar Data Systems, Bar Code Labor Tracking Example, http://www.windowareaccounting.net/barcode.htm , printed Apr. 17, 2014.

Kronos Incorporated, Workforce Timekeeper, http://www.kronos.com/Time-Attendance/Time-Keeping-Software.aspx, printed Apr. 17, 2014.

Workforce Software, Data Collection, http://www.workforcesoftware.com/products/data-collection/, printed Apr. 24, 2014.

Bill4Time, Your Complete Time Billing Solution, http://www.bill4time.com/?gclid=CLrs-9KzgLwCFWJo7AodGW4ACQ, printed Apr. 17, 2014.

Casco Development; Shop Activity/Labor, http://www.cascodev.com/shopvue/software/labor-tracking-software?gclid=CNvY7vuzgLwCFeHm7AodQQgAPA, printed Apr. 24, 2014.

Redcort Software, Virtual Timeclock, http://www.redcort.com/timeclock/?gclid=CLfqo-q0gLwCFaHm7AodzzwAeQ, printed Apr. 24, 2014.

Kerem Erkan, Qrafter—QR Code and Barcode Reader and Generator, https://itunes.apple.com/us/app/qrafter-qr-code-barcode-reader/id416098700?mt=8, printed Apr. 24, 2014.

Tacoty CN, Barcode Scanner, https://play.google.com/store/apps/details?id=cn.menue.barcodescanner, printed Apr. 24, 2014.

* cited by examiner

SYSTEM, APPARATUS AND METHOD FOR ACTIVITY GUIDANCE AND MONITORING

CROSS-REFERENCE TO RELATED APPLICATION

This application claims the benefit of priority from U.S. Patent Application No. 61/672,619 filed on Jul. 17, 2012, which is incorporated herein by reference.

FIELD OF THE DISCLOSURE

The invention relates to systems, apparatus and methods for activity guidance and monitoring. More specifically, the invention relates to activity guidance and monitoring of labor workflow.

BACKGROUND

Business operations have used methods for guiding activity and monitoring that activity through reviews of paperwork received on periodic schedules. Businesses may use the information collected to monitor employee productivity, schedule vendors for new materials as they are needed and/or schedule transportation for completed components or projects. In addition, they may keep track of specific projects to ensure that the progress is consistent with the expected delivery date of the project. In order to assess this information, it may be necessary to compile certain information regarding a project, material usage and/or an employee. In such cases, the information may be compiled by hand or input into a computer system by hand based on the paper copies. Accordingly, an accurate analysis of the above considerations cannot be conducted until after the material is fully compiled.

For illustrative purposes, manufacturing operations have used paper work orders to provide activity guidance and upon later collection and review of those work orders, the business may monitor the output from one or more people in the manufacturing process. A work order may be provided to an employee with one or more projects and/or one or more sequence steps for each project. For example, the work order may be for the assembly of a product and include five steps for completing the assembly. The work order may provide a simple identification for the work to be completed or a short description in the limited space available. The employee takes the work order sheet and fills in a start time by hand when the employee begins the specific step indicated. Upon completion of that step, the employee would fill in the stop time. Depending on the work order, the employee may also manually fill in additional information for the project, such as the work center, setup time, and/or a quantity of components made during that step. Finally, each employee may also be required to maintain a time sheet to account for the time spent working on each project and any breaks during the day.

Following the completion and/or return of the work order to a supervisor or other person, the work order information is processed and may be input by a typist into a computer system. Once all the information is input, a status report may be created for summary review. In addition to the delay of the system, work orders may be lost or destroyed during the manufacturing operations causing potentially inaccurate information to be provided, either due to it being completely missing or improperly noted by memory from the employee on a replacement sheet. In addition, work orders may be given to other manufacturing personnel in certain situations further increasing the possibility of inaccurate information in a compiled analysis if the work order is lost without knowledge of the status of the project. For example, if different people conduct different steps of an assembly project, the work order and component of the project may be given to the employee performing the next step and so on down the line.

SUMMARY

The present disclosure provides systems, apparatus and methods for activity guidance and monitoring. Some embodiments of the invention include a networked system of devices to provide activity guidance and monitoring in a near real-time environment. Some embodiments include methods for operation of activity guidance and monitoring system with near-real time updates. In some embodiments, the system operation allows for improved productivity, scheduling, reporting efficiency, coordination and/or other beneficial results.

One embodiment of the system includes a networked central server accessible by one or more devices capable of scanning printed codes such as a bar code or a QR code. Scanning devices may include devices associated with certain work areas and/or mobile devices, including but not limited to smart phones, tablets, and other portable scanning devices. The system may also include reporting stations capable of creating outputs such as reports, warnings, alerts, and other outputs based upon the information received from the scanning devices. The outputs may be based on information from a single scanning device or employee and/or compiled information from multiple scanning devices and/or employees.

In some embodiments, the system includes a smart phone running a scanning application to read QR codes. A QR code may be used as an employee ID affixed to an employee badge and another QR code may be printed on a work order for the assembly of a product. When the employee scans the QR code on the badge, the system recognizes and registers the employee ID. When the QR code for the work order is scanned, the system recognizes the work order and displays an electronic version of the work order. The system further associates the employee ID with the given work order and all entries made with respect to the work order on that device.

The employee may review the status of steps in the work order in detail or by a quick reference, such as a standard color coding for status (e.g. different colors for completed, in progress, and not started). Through a user interface on the smart phone, such as a touch screen, the employee may select the step they intend to work on, beginning a work progress timer. In some cases, the system may allow a user to adjust the time for the transaction start. In addition to tracking the time, the system may change the status indicator. Such changes may be reflected locally and/or across the system.

When the employee stops working on a step, they may press a button to stop the timer. In some embodiments, it is the same button used to start the timer for that step. Once again, an option may be provided to allow the employee to adjust the time to reflect the actual stop time. If they have completed the step, the indication for the step may be updated to reflect completion. If the step is not yet complete, the indication may be updated (or remain) as an in progress indication. The update may be reflected locally and/or across the system.

Some embodiments may include a locally stored version of the system for operation and a posting option to allow the local data to synchronize with the rest of the system only upon command. The system may allow posting throughout the process. In other systems, posting of a transaction may only be available under certain circumstances. For example, only the initial start and the final completion transactions may be posted.

When a transaction is posted, the system will determine if the server database contains the work order at issue. If it does not, a new work order may be created indicating the steps associated with that work order and the current status of the steps in that work order. If the work order already exists, the status in the server database may be updated to reflect the posted transaction.

In some embodiments, the device may evaluate whether the step is complete. If it is, a display allowing the option to scan a new work order or select another step of the existing work order may be provided. If the step is not complete, the device may automatically return to the electronic work order screen for the next action from the employee.

In some embodiments, the system only registers started and stopped status. Therein, when a button is pressed to start the step, the timer begins, and when the button is pressed to stop the step, the timer stops. In such a system, the stop button only indicates that the employee has stopped working on that step, and may not reflect that the step is completed. In other embodiments, the system may provide options for the employee to select the current status of the step upon a stop selection, such as paused and completed options.

Some embodiments may update both local and remote databases with every change at the device. Some embodiments may include an access availability indicator showing if the device has access to the networked system. In such an embodiment, the device may maintain a local storage database and queue the updates upon connection with the networked system.

Some embodiments of devices may be wirelessly associated with the network. Other embodiments of the devices may be wired to the network.

The system, apparatus and method will be described in relation to a manufacturing process for illustrative purposes throughout this disclosure. However, one skilled in the art will recognize that the system, apparatus and method disclosed herein may be applicable to additional industries and/or purposes, and such additional applications are within the scope and spirit of the disclosure.

Additional aspects, advantages and features of the present invention are included in the following description of exemplary examples thereof, which description should be taken in conjunction with the accompanying figures, wherein like numerals are used to describe the same feature throughout the figures. Some of the actions taken in the system may be ordered in other manners, addressed simultaneously or concurrently, altered, replaced and/or left off a system and fall under the scope and spirit of the disclosure.

A BRIEF DESCRIPTION OF THE DRAWINGS

DETAILED DESCRIPTION

Figure 1:
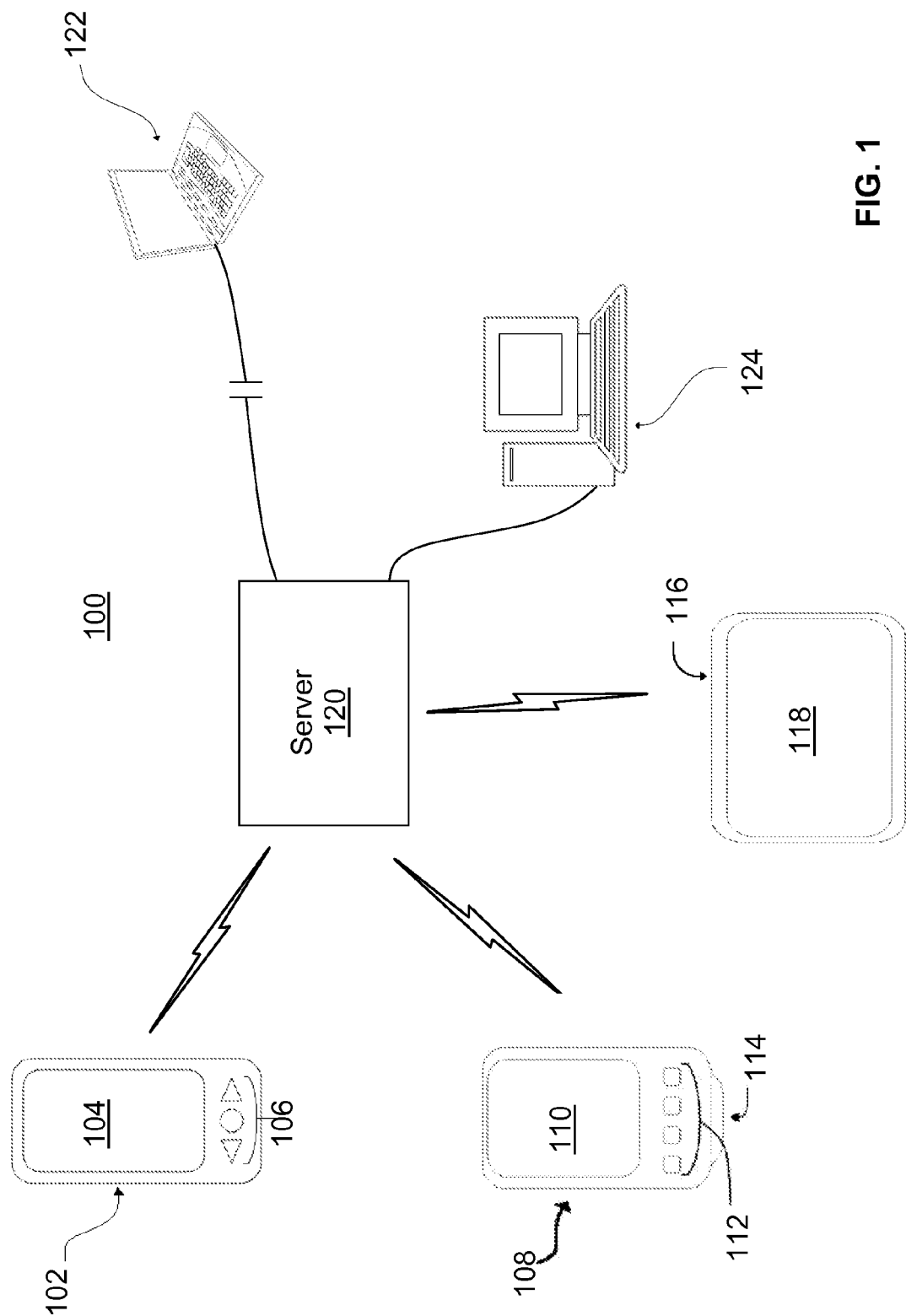
FIG. 1 is a drawing of an embodiment of a system of the disclosure.

FIG. 1 depicts a system 100 having networked components associated with each other by wireless and wired connections. One skilled in the art will recognize that any means of connecting components to allow communication signals to be transmitted may be implemented and remain within the scope and spirit of the present disclosure. A first mobile device is shown as smart phone 102 having a display 104 and a user interface 106. In this embodiment, the smart phone 102 also includes a camera. A second mobile device is shown as portable scanner 108 having a display 110, a user interface 112, and a scanner 114. A third mobile device is shown as a tablet 116 having a display 118. In this embodiment, the tablet 116 includes a camera and/or a scanner on the back, and the display 118 also operates as the user interface utilizing touch screen technology. One skilled in the art will recognize that the three mobile devices are depicted to illustrate the variation of devices that may be used in implementing the system disclosed. Unless otherwise noted, the descriptions of mobile devices may be used interchangeably and the descriptions of use are for illustrative purposes only.

In some embodiments, a scanning device having similar functionality to one or more of the three mobile devices depicted may be stationary. One or more stationary devices may be located in a strategic location and/or a series of locations. As used herein the term scan includes any device, process, or system to recognize an identification image or tag such as a QR code. For example, using a camera to capture an image of the QR code in conjunction with an application to recognize and read the QR code from the captured image. The term QR code is used herein for illustrative purposes, and should be understood to include other types of codes or identifiers, such as bar codes, alphanumerical codes, work order numbers, and others, which may be recognized by the application. Some embodiments of the present disclosure may use radio frequency identification technology such that the scanner electronically reads an RFID tag instead of a QR code. Such embodiments remain within the scope and spirit of the present disclosure.

In the system 100, the mobile devices 102, 108, and 116 are shown as wirelessly connected to a server 120. In this embodiment, the server 120 is also connected to a local office computer 124 and a remote office computer 122 through wired connections. One skilled in the art will recognize that the server 120 may be any computing device capable of the operations described herein and remain within the scope and spirit of the present disclosure. In some embodiments, system 100 may include multiple servers 120. For example, a company with multiple manufacturing locations may have servers 120 located at each location for local operation of the system 100, and also connected with a central server 120 at another location, such as a corporate office. In some embodiments, server 120 may be part of the local office computer 124 or the remote office computer 122.

In some embodiments, the server 120 may be a host server maintained by a third party for access during operation. The server 120 may provide additional industry analytics and/or interaction while maintaining confidentiality of specific company information. For example, the server 120 may facilitate the scheduling and/or sale of vendor materials as needed by a given company. For another example, one company may allow a second company to monitor progress of a specific project commissioned by the second company. The third party may further provide and maintain the application software associated with system 100. One skilled in the art will recognize that the application may be provided as software accessible on a specified location, such as the server 120, downloadable from a storage device, stored in another component of the system 100, issued as a computer program product on a tangible storage medium, and/or otherwise provided or made available for use.

Figure 2:
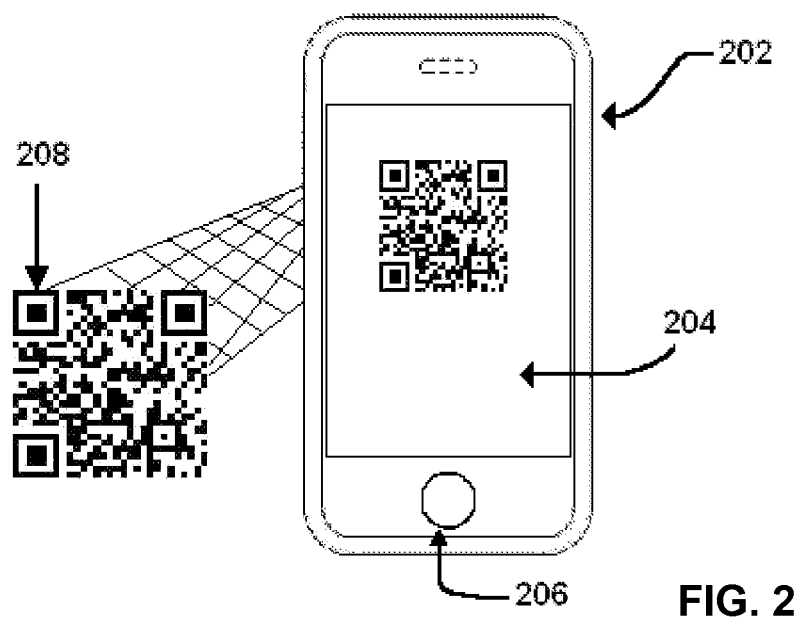
FIG. 2 is a drawing of an embodiment of a device of the disclosure.

FIG. 2 depicts a smart phone 202 operating as a scanning device. Smart phone 202 is used as a mobile scanning device of system 100 described above. One skilled in the art will recognize that any device capable of scanning and operating the system of the present disclosure may be used as a mobile scanning device of system 100. In this embodiment, the smart phone 202 contains a display 204 and a user interface. In this embodiment, one aspect of the user interface of the smart phone 202 is button 206. In some embodiments, additional buttons, touch screen controls, switches, and/or other controls may make up additional aspects of the user interface.

FIG. 2 shows the smart phone 202 scanning a QR code 208. In this embodiment, the smart phone 202 includes a camera and an application for reading the QR code 208 using the camera optics. While the camera focuses on the QR code 208, the display 204 of smart phone 202 shows a view of the QR code 208 in this embodiment. The application for reading the QR code 208 may be embedded in the hardware of the device, a program running on the device, a program running on a networked device, or a combination of local and remote elements. For example, the application may be a downloadable software program. For another example, the application may be a local program that transmits the image of the QR code 208 to a remote program that parses the image of the QR code 208 and reads the QR code 208.

Figure 3:
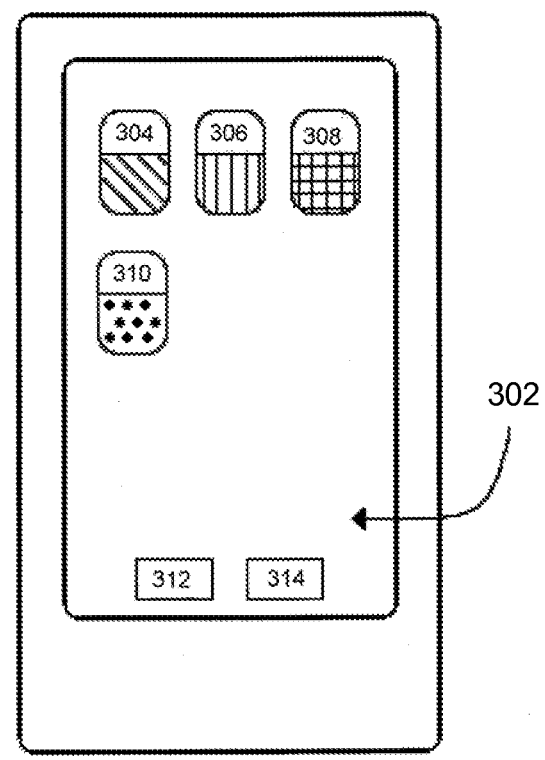
FIG. 3 is another drawing of an embodiment of a device of the disclosure.

FIG. 3 depicts a front view of another embodiment of a scanning device—smart phone 300. The smart phone 300 includes display 302 that also operates as a user interface for the smart phone 300. Shown in display 302 are a variety of icons 304-314 which further operate as program buttons in this embodiment. In other embodiments, a separate user interface of a scanning device may control the icons 304-314.

In some embodiments, the icons 304-310 may represent work order steps. In other embodiments, the icons 304-310 may represent active projects. One skilled in the art will recognize that the icons 304-310 may represent any number of activities, reminders, and/or action items applicable to the program in use. Each of the action item icons 304-310 is shown with a different pattern. In some embodiments, the different patterns may reflect a different attribute of the step. For example, each pattern may reflect the current work status of the step. For another example, each pattern may reflect a prioritization of the steps. One skilled in the art will recognize that the variation in pattern may represent any number of relevant attributes associated with the action item.

Post icon 312 allows the user to control the posting of a status update. For example, selecting the post icon 312 may initiate a transmission updating the status of an action item reflected by icon 304 within a remote database. Clear icon 314 may allow the user to clear all or a portion of the active project screen. For example, selecting the clear icon 314 may remove any changes to the project made by the user. For another example, the clear icon 314 may dismiss the current project screen in its entirety causing the application to restart at an initialization screen—such as the screen to scan a QR code. For another example, the clear icon 314 may only clear the record for all changes since the last time the user posted an update using the post icon 312. One skilled in the art will recognize that post icon 312 and clear icon 314 are provided for illustrative purposes only and alternative and/or additional control icons may be used. Some embodiments may not include any control icons. The icons 304-314 will be discussed further herein in the context of FIG. 4.

Figure 4A:
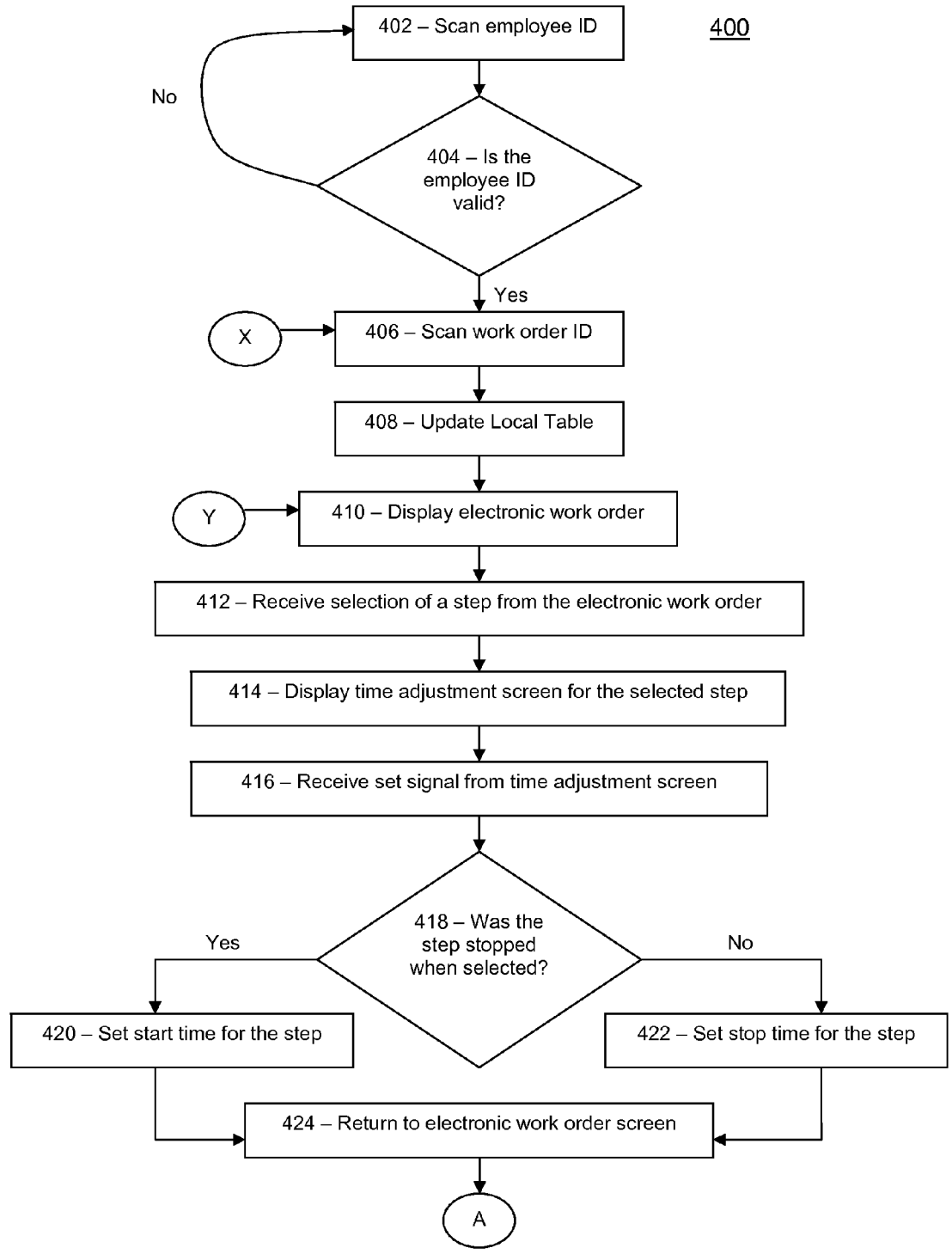
FIG. 4A is a flow chart depicting the first part of an embodiment of the process of the disclosure.
Figure 4B:
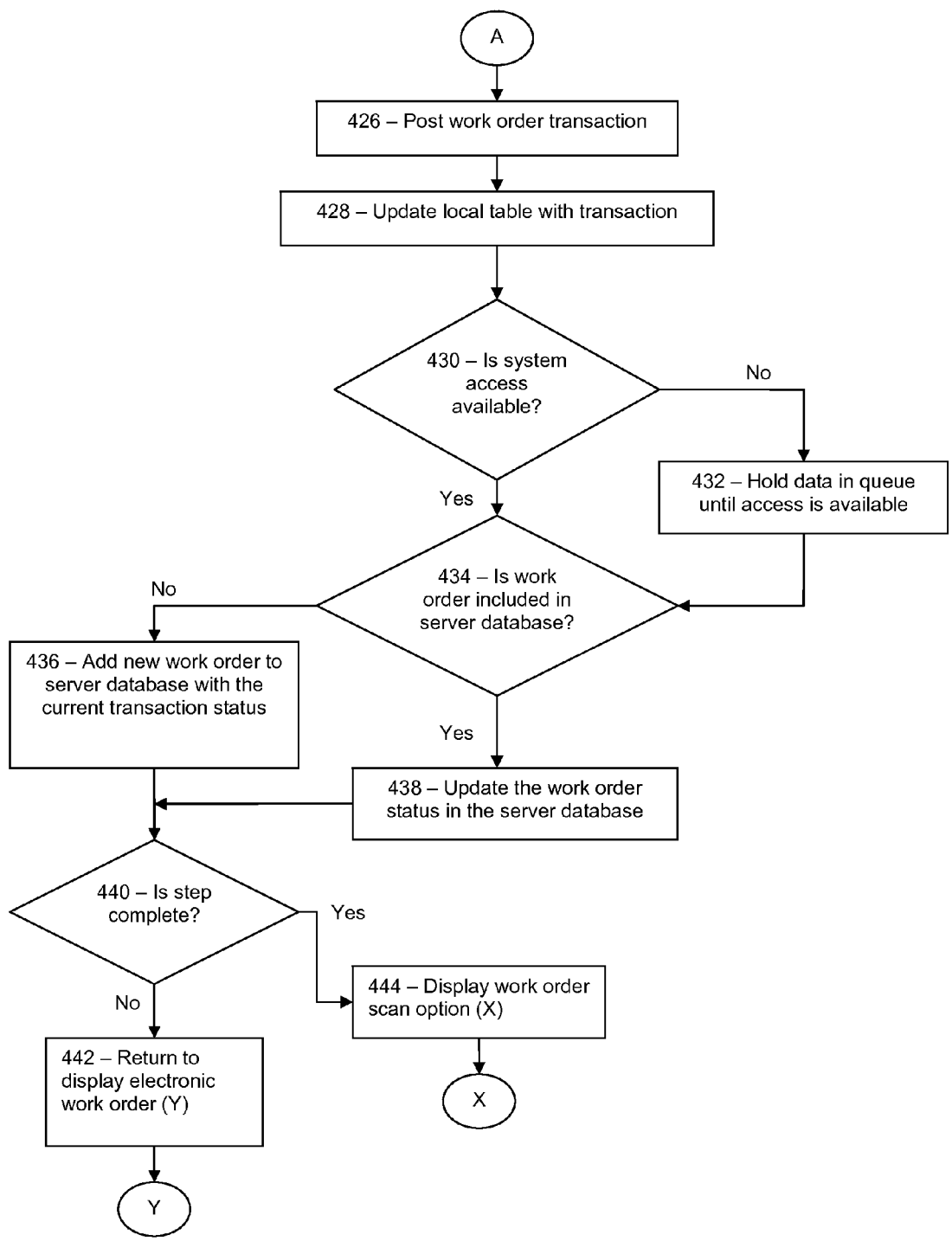
FIG. 4B is a flow chart depicting the second part of an embodiment of the process of the disclosure.

With reference to FIG. 4, a flowchart of a process 400 is depicted, which is an embodiment of the present disclosure. The process 400 may be implemented by the system 100, a method of the present disclosure, or a computer program product of the present disclosure. The process 400 describes an embodiment of interaction of the mobile scanning devices (smart phone 102, portable scanner 108, tablet 116, smart phone 202, and/or smart phone 300) with server 120 of system 100. Process 400 does not depict the reporting or monitoring capabilities of the system 100, which is described further herein. One skilled in the art will recognize that one or more elements of process 400 may be optional and/or reordered and remain within the scope and spirit of the present disclosure. In some embodiments, additional elements may be included or implemented in place of elements shown in FIG. 4.

Process 400 describes an embodiment of the disclosure relating to the processing of work orders. The disclosure will use the processing of work orders and an implementation for a manufacturing process for exemplary purposes. One skilled in the art will recognize that embodiments of the disclosure may be applied to other types of fields and/or projects, such as service projects, software development projects, and others, and remain within the scope and spirit of the present disclosure. In addition, the process 400 may be tailored to specific company structures and operations.

In box 402 of the process 400, an employee identification is scanned. For example, an employee may be assigned an employee badge that includes a QR code. The employee may use the smart phone 102 executing the application used for the process 400 to scan the QR code on the employee badge. In some embodiments, smart phone 102 belongs to the employee. In other embodiments, the smart phone 102 belongs to the employer.

Upon reading the QR code, the system 100 determines if the employee identification is valid as shown by box 404. For example, the system 100 may compare the scanned QR code to a database of approved QR codes. If the scanned QR code does not match a QR code in the database, the application may return to box 402 to scan another employee identification or attempt to rescan the previously scanned employee identification. In some embodiments, system 100 and/or smart phone 102 may store a log of failed attempts to validate an employee identification. Such a log may include a copy of the scanned QR code and other information. An administrator may review the log to determine why system 100 did not recognize the scanned QR code, and the administrator may take appropriate action if needed. For example, if the QR code is not sufficiently legible, the administrator may verify the employee using the QR code and assign a replacement employee badge. For another example, if the QR code was associated with a prior employee, the administrator may contact security personnel to review the situation.

In some embodiments, if the system 100 determines that the employee identification is valid, the smart phone 102 may be used to scan a work order identification as shown in box 406. Once the employee identification is verified, system 100 may associate the activity of the application running on smart phone 102 with that identified employee. For example, the application activity may be used to verify hourly employee payments. In addition, a log of the activity may be maintained for employee evaluation purposes.

In some embodiments, system 100 may verify whether the employee identification represents a selected employee or group of employees. In such a system, the application may provide alternative options based upon the employee status. For example, the system may verify whether the employee is a supervisory employee. If the employee is a supervisor, the application may provide a display associated with monitoring the employees or the projects that person supervises. For another example, the application may provide notifications associated with a specific employee based upon verification of the employee identification.

In box 406, a work order identification is scanned. For example, a hard copy work order may be issued to the employee with a work order identification QR code printed on the work order. The employee may scan the work order identification QR code using the smart phone 102. In some embodiments, the work order identification is printed on a traditional paper work order. In some embodiments, work order identifications may be provided at a single location, such as a break room, for the employees to scan prior to entering a work floor. Such a system may limit the unnecessary paper debris from accruing on an active work floor.

In some embodiments, the work order identification may be provided on an electronic display available to the employees. For example, a computer containing work orders for all employees may display work order QR codes, which may be scanned by the mobile devices. In such a system, the computer may display work order identification codes based upon any number of factors, such as work priority, employee capability, workstation or equipment availability, and/or any other factor or combination of factors. For example, the employee may scan their badge with a scanner associated with the computer or enter their name in a user interface for the computer such that the computer displays the next work order associated with that employee. The employee may then scan the displayed QR code with the mobile scanning device.

For another example, a work order identification may be provided with a display associated with specific workstations. In such embodiments, the display may show the work order identification code for the current project on that station until the status is updated through system 100.

In some embodiments, the process does not include box 406. In such embodiments, upon verification of an employee identification, the work order associated with that employee is available to the smart phone 102.

In box 408, a local table stored in memory of the smart phone 102 is updated by the application. The local table is updated with at least a portion of the employee's active work order and/or project. In some embodiments, a complete work order is stored into the local memory. In other embodiments, a select portion of the work order is stored in local memory and additional portions are available from the server 120 of system 100. For example, if a work order has ten steps, the local table may contain information on the first five steps only while the server 120 stores information on all ten steps. In such an embodiment, each time the employee posts a completed step (discussed further below), the application may delete the information about the completed step from the local table and download information on the next step of the process from the server 120.

In box 410, an electronic work order is displayed. For illustration, FIG. 3 shows the smart phone 300 with a display 302. The display 302 depicts an exemplary electronic work order with the icons 304-314 providing a user interface of the smart phone 300. One skilled in the art will recognize that the representative display of an electronic work order is for illustrative purposes and the display of the electronic work order may be varied and remain within the scope and spirit of the present disclosure.

In the embodiment shown, icons 304-310 are work order step icons, each of which may represent one step of the work order. In this embodiment, each step icon 304-310 is depicted with a different pattern. One skilled in the art will recognize that multiple methods of visually distinguishing items in a display may be implemented and remain within the scope and spirit of the present disclosure. For example, visual differences may be depicted through using various patterns, colors, light levels, visual effects (such as blinking or movement), and/or any other visual variation or combination of variations. As used herein, the term pattern should be understood as including other depictions of visual differences. Each pattern may represent an attribute associated with the step. One skilled in the art will recognize that multiple icons may have the same pattern due to common attribute characteristics. One skilled in the art will further recognize that the associated attributes of the steps may vary and remain within the scope and spirit of the disclosure.

For an example of a representation, each pattern may indicate a current status of the step. The pattern of step icon 304 may indicate the step is completed. The pattern of step icon 306 may indicate the step is in progress. The pattern of step icon 308 may indicate the step has not been started. The pattern of step icon 310 may indicate the step cannot be started until a precondition is met. For example, this pattern may be shown if completion of step 306 is a requirement for step 310 to begin. The pattern of step 310 may also be shown if system 100 recognizes a necessary material or piece of equipment for completing step 310 is unavailable at this time.

For another example, each pattern may indicate a categorical type of step. The pattern of step icon 304 may indicate the step relates to machining a component. The pattern of step icon 306 may indicate the step relates to preliminary assembly of components. The pattern of step icon 308 may indicate the step relates to securing components in place. The pattern of step icon 310 may indicate the step relates to a quality review of the assembly.

The electronic work order display 302 may include a scrollable section if not all of the steps to display with the electronic work order fit in the space provided in display 302. In such a situation, user interface controls of the smart phone 300 or other mobile scanning device may be used to scroll to a selected step.

The electronic work order display may also include control icons such as the post icon 312 and the clear icon 314. Such control icons may be used to manage and/or communicate employee activity through system 100.

In box 412, a selection of a displayed step from the electronic work order is received. For example, an employee using smart phone 300 may tap on step icon 306 of the work order display to select step 306 using the touch screen capabilities of the smart phone 300. When the screen is touched, the application operating in smart phone 300 receives the selection of step 306.

In box 414, a time adjustment screen is displayed. In some embodiments, the time adjustment screen may provide a default of the current local time and allow alterations of the time for the employee to indicate an actual time associated with the action. For example, if an employee is delayed from using the application following completion of the step for a few minutes, the employee may change the time to reflect an actual completion time instead of the current input time. In some embodiments, the time adjustment screen may not provide a default time, but require the user to input the relevant time.

In box 416, the application receives the set signal from the time adjustment screen. For example, after the employee provides the correct time, the employee may press a set button to indicate the selection of the correct time. The application receives the set signal and stores the correct time, as adjusted if necessary, in local storage.

In box 418, the application will check whether the selected step was stopped at the time that it was selected. If the step is currently stopped, the application will set the corrected time as a start time for the step as shown in box 420. If the step is not currently stopped, the application will set the corrected time as a stop time for the step as shown in box 422. As mentioned above, the order of the boxes may vary and remain within the scope and spirit of the present disclosure. For one example, the box 418 and the identification of whether a start or stop time is applicable may occur prior to or concurrently with adjusting the time entry as shown in boxes 414 and 416. One skilled in the art will recognize that the application may implement alternative decision options to that shown in box 418 which result in a determination of the changed status of the selected step and remain within the scope and spirit of the present disclosure. For example, the application may evaluate whether the step was in progress when selected, whereby if it was in progress, the selection indicates a stop time, and if it was not in progress, the selection indicates a start time.

In box 424, the application returns to the electronic work order screen. In some embodiments, the smart phone 300 may return to the representative electronic work order screen shown in display 302. Based upon the selections, the electronic work order screen may reflect a change in the status of a step. For example, if the employee began step 308, the pattern of step icon 308 may change to indicate the step is in progress. One skilled in the art will recognize that the form of a status update may vary and remain within the scope and spirit of the present disclosure.

In some embodiments, the smart phone 300 may return to an alternative version of the electronic work order screen shown in display 302. For example, if the employee began step 308, the electronic work order screen may provide a step description section that provides a summary description of the active step to which the employee may refer. In some embodiments, the electronic work order may provide access to a detailed description of the active step and/or other step specific data. For example, when step 308 becomes active, the application provides an icon to indicate the availability of details regarding step 308 which the employee may select if needed. In another embodiment, the summary description of step 308 may include links to additional details for the summarized elements of the step 308.

The additional step details in some embodiments of the present disclosure may include a further technical description, graphical images of components, video of the step, audio descriptions or any other multimedia presentation to assist in describing the step or an element thereof. For example, the details may provide a computer generated schematic representation of an assembly of components. For another example, the details may provide an inventory checklist for the employee to ensure all necessary elements are readily available for completion of the step. For another example, the details screen may provide information on common mistakes, errors, or quality assurance factors, which may improve the performance of the step by the employee. One skilled in the art will recognize that the use of a details option and the content thereof may vary and remain within the scope and spirit of the present disclosure.

In some embodiments utilizing additional step details, those details may be available only through the network. In other embodiments, the details may be provided for local storage on the mobile scanning device. One skilled in the art will recognize that a variety of factors may influence the method of providing additional details to a mobile scanning device in system 100, including but not limited to storage availability of the hardware, network availability in a specific implementation of system 100, likelihood of selected employees to need the additional details, and other factors. For example, some embodiments of system 100 may require a network connection to view the details stored on server 120 to minimize local storage usage in the mobile scanning device. In embodiments of the system 100 where network availability is limited, details may be provided as part of the work order and stored in local storage of a mobile scanning device. Other embodiments may provide details locally only to select employees. For example, a new employee or an employee that is not experience with a particular step may receive the details for local storage while more experienced employees would access any details over the network from the server 120.

In some embodiments, the additional step specific data may be viewable apart from selecting or initiating the work order step for further processing. For example, the user interface of smart phone 300 may register one action, such as a double tap on the step icon 306, as indicating the selection to initiate step 306, while another action, such as a single tap on the step icon 306, as a request to view further information regarding the step 306 without indicating an initiation of step 306.

In box 426, the application receives a signal to post a work order transaction. For example, an employee may press the post icon 312 on the electronic work order screen. When the employee presses the post icon 312 the transaction may be updated in the local table as shown in box 428. This may entail transferring the time and status data from a temporary storage of smart phone 300 into the local table storage in smart phone 300. In some embodiments, posting the transaction locally occurs in conjunction with selection of a step, time adjustment, and/or determination of whether the status change is a stop or a start for the selected step.

In some embodiments, posting a work order transaction indicates an update to the database in server 120 is available from the mobile scanning device. The application will determine if system access is available in box 430. If access to the server 120 of system 100 is unavailable, e.g., a wireless signal from smart phone 108 to server 120 is not available, the transaction data is placed in a queue until access is available as shown in box 432.

If access is available or upon access becoming available, the process 400 evaluates whether the server database currently includes the work order as shown in box 434. If the database in the server 120 does not include the work order, the work order is added to the database of server 120 with the status of work order transactions as depicted by box 436. If the work order already exists in the server 120 database, the work order status is updated with the new transaction information.

In box 440, the application evaluates whether the step is complete. The application may determine whether a step is complete based upon a variety of factors, assumptions, and/or user inputs. For example, if the selected step status is "in progress," the application may determine that the step is not complete. In some embodiments, the application may assume based upon statistics that a step that has been in progress for a threshold amount of time and that is now stopped is therefore complete.

In some embodiments, the application may display icons for the user to select a type of stoppage when the application determines the transaction indicated a stoppage of time. For example, the application may display a pause icon and a complete icon to allow a user to indicate the reason for stoppage at this time. The icons may alternatively allow the selection of a break or completion. One skilled in the art will recognize that the application may be tailored for specific possibilities based upon the relevant field or industry.

In some embodiments, the application will recognize that selection of one step while another step is running may indicate a stop time for the previously running step. For example, if an employee begins step 310 before stopping the step 308 in system 100, the system will treat the start time of step 310 as a stop time for step 308.

As shown in box 442, if the step is not complete, the application may return to box 410 to display the electronic work order or a variation thereof. For example, if the initial use of process 400 is to start step 308, upon posting the transaction to the database of server 120, the display will return to an electronic work order screen waiting for a selection of step icon 308 indicating a completion of step 308.

Alternatively, as shown in box 444, the application may display an option to scan another work order consistent with box 406 if the step is complete. One skilled in the art will recognize that the option to scan another work order may be available at any time during the process 400, and may be a standard user interface option.

Referring back to FIG. 1, additional capabilities of the components may be better understood based on the process 400 of FIG. 4. The scanning devices 102, 108, and 116 of system 100 may be utilized for a variety of purposes associated with activity guidance and monitoring.

In some embodiments, mobile scanning devices of the system 100 may include location recognition capabilities, and the system 100 may verify the location of a mobile scanning device during operation to ensure the employee is in an approved work location. For example, a location verification system may prevent an employee using smart phone 102 from scanning their employee work identification badge to indicate deceptively they have begun work when they are not at the work location. In some embodiments, the location recognition capabilities may be used to indicate work stoppages when the employee leaves a selected workstation. This may provide more accurate work time analysis while reducing interaction with the application by the employee. One skilled in the art will recognize that a variety of location determining devices may be used to verify the location of the mobile scanning device and for comparison to selected geographic areas. Location devices may include global positioning systems, local positioning system, proximity systems, and others.

In some embodiments, an employee's smart phone 102 may operate as their employee badge. For example, upon entering a requisite proximity to the wireless network, the smart phone 102 will pair with the network indicating that the employee has arrived at the work location. In such embodiments, work orders for the specified employee may be sent to smart phone 102 upon verification of the employee phone through network security.

In some embodiments, selected employee identification codes and/or devices may be associated with supervisory positions. The options available for the supervisor may differ from the available options for other employees. For example, upon scanning an employee identification QR code associated with a supervisor, tablet 118 may provide displays and/or options to view supervised employees' work orders and updated progress. Under the supervisory application, the tablet 118 may receive information from server 120 and/or directly from another mobile scanning device such as portable scanner 108. In addition, the tablet 118 may interrogate other devices for the status of transactions that have not yet been posted. The tablet 118 may provide analytics regarding each employee's progress and/or the progress of specific projects. In some embodiments, the tablet 118 may be capable of compiling information from multiple sources to provide an aggregated analysis of the supervised progress.

In some embodiments, different supervisors may be provided with differing options. For example, assistant managers may have a variety of options specific to the projects and/or people with which each assistant manager works, while a manager may have additional options relating to all the assistant managers' progress. One skilled in the art will recognize that the options provided to each employee, supervisor, manager, or other person may vary in accordance with a company's preference and/or structure and remain within the scope and spirit of the present disclosure.

Referring to FIG. 1, the local office computer 124 may be hardwired to a local system server 120. In other embodiments, the local office computer 124 wirelessly connects to the system server 120. For example, the local office computer 124 may be another tablet 118. The local office computer 124 may operate as a supervisory computer or an alternate application for use with the system 100. For example, the local office computer 124 may include an application for preparing reports based upon information in the server 120 database.

The local office computer 124, the server 120, and/or another component of system 100 may compile, aggregate, analyze or otherwise manipulate the information for reporting and/or other purposes. The application of the local office computer 124 may provide for additional monitoring of the active processes similar to that described in conjunction with supervisory devices above.

In some embodiments, the local office computer 124 is used to create and prepare reports based upon data aggregated from mobile scanning devices of the system 100. One skilled in the art will recognize that the reporting capabilities may allow for reports to be provided in hardcopy, electronically, via selected displays, and/or other outputs, and may be provided to only a selected set of individuals based upon the report contents. Reports may be customized to a specific company's industry and/or structure. Reports may be developed for the evaluation of employees, project progress, material usage, transportation scheduling, production estimates, sales quotes and scheduling, and other purposes. For example, reports comparing the average time for completion of specific steps by different employees may be used to ensure the most efficient time management for the overall process.

In some embodiments, the local office computer 124 is used to prepare and distribute periodic work order assignments to employees. In some embodiments, work orders may be input through a user interface of the local office computer 124 by a user. In some embodiments, the local office computer 124 may develop suggested work order assignments based upon employee analytics. In such embodiments, the local office computer 124 may include an application for determining the preferred employee placement in a manufacturing process and the preferred assignment of work order steps. For example, the local office computer 124 may aggregate historical data regarding the employee completion times for various steps of a project. Based upon that data, the local office computer 124 may prepare work orders for the project for each employee to provide the most efficient completion rate for the entire project.

One skilled in the art will recognize that the system 100 may utilize any number of employee, client, inventory, equipment and/or other analytics to evaluate preferred work order development for a selected purpose, such as time, quality, and/or other purposes. For example, in some embodiments, the local office computer 124 may suggest one or more employee work order combinations with estimated completion times, quality rates, and/or efficient material or equipment usage for review by a project manager or other supervisor. Upon selection by the project manager or other supervisor of a preferred employee work order combination, the local office computer 124 may provide work order information for each employee. For example, the local office computer 124 may print work orders with a work order identification QR code associated with an electronic work order stored in the server 120 of system 100. For another example, the local office computer 124 may associate employee identification QR codes with an electronic work order stored in the server 120 of system 100.

In some embodiments, the system 100 may include additional applications for moves reporting in order to track the completion and movement of parts during the project. In such embodiments, the scanning devices of system 100 may include icons to indicate the receipt and delivery of parts associated with that employee's work order steps. For example, an employee assigned the step of assembling part A with part B to make component AB may press an icon each time the employee receives a part A or a part B, and may press another icon to indicate that that employee has delivered component AB to the appropriate location. In another example, the application may prompt an employee to enter a quantity of parts received and/or delivered each time the icon indicating a receipt or delivery is pressed. One skilled in the art will recognize that additional identification codes associated with the parts and components of a project may be used in conjunction with the mobile scanning devices to track movement of the parts and components.

In some embodiments, the system 100 may include additional applications for tools reporting in order to track the movement of tools and other equipment during the project. In such embodiments, the scanning devices of system 100 may scan identification codes associated with the tools and other equipment.

In some embodiments, the system 100 may include additional applications for inventory reporting in order to track the movement of materials and parts in the inventory system. In such embodiments, the scanning devices of system 100 may scan identification codes associated with materials and parts in the inventory system. The system 100 or a user thereof may use the tracking of materials and parts in inventory to evaluate vendor scheduling, project planning, costing, and/or for other purposes.

In some embodiments, system 100 may allow for adjusting active work orders in the system 100. For example, a supervisor using local office computer 124 may adjust electronic work orders of the employees to cover project steps assigned to an absent employee. For another example, a supervisor may adjust electronic work orders to prioritize the production of a quantity of parts that are necessary for a downstream step, but currently under produced. One skilled in the art will recognize that adjustment of active work orders may be conducted for a variety of purposes in different manners, and remain within the scope and spirit of the present disclosure.

In some embodiments, the remote office computer 122 may be used in a similar manner as local office computer 124. In some embodiments, the remote office computer 122 may be used to provide corporate wide reporting. In some embodiments, the remote office computer 122 may include alternative and/or additional options to the local office computer 124 and/or the mobile scanning devices. For example, the remote office computer 122 may aggregate and analyze data from multiple servers 120 and the local systems associated with each server 120. In such a system, the remote office computer 122 may evaluate statistics regarding multiple manufacturing locations. For example, a new project may be assigned to a manufacturing location with high quality statistics while a rush project may be assigned to the most efficient manufacturing location.

In some embodiments, the remote office computer 122 may coordinate production of parts at certain locations with assembly of the parts at other locations. The remote office computer 122 may coordinate projects and/or specific employee work orders for the most efficient company wide production scheduling. For example, the remote office computer may shift a manufacturing location to focus on only one type of part in order to coordinate an existing transportation schedule in order to fill excess dead space and prevent unnecessary transportation trips saving expenses and maintaining efficient production. One skilled in the art will recognize that the use of a remote office computer 122 or any system computing device to coordinate corporate wide action in various ways may be facilitated through the system 100 and benefit from the efficient data gathering of system 100.

In some embodiments, the various networked components of system 100 may facilitate employee communications, notifications, warnings, scheduling, and/or other activity. The communicated activity may be directed specifically to the desired employee based upon the verification of an employee identification that has been scanned.

One skilled in the art will recognize that the embodiments of the disclosure may be implemented in a variety of manners. One will further recognize that the following implementations are for illustrative purposes and may be varied and remain within the scope and spirit of the present disclosure.

In some embodiments, an apparatus for activity recordation may comprise a scanning component capable of registering an identification code, a user interface component capable of receiving user commands, an output component transmitting information to the user, a storage component capable of storing information, a communications component capable of transmitting and receiving information from a separate source, and a processing component capable of administering the workflow operation inputs and outputs. The processing component may facilitate recognition of the registered identification code and identify the appropriate workflow information based upon the registered identification code. The processing component may also provide workflow options to a user through the output, receive workflow selections through the user interface, and transmit updates to the workflow through the communication component. In some embodiments, the processing component may send identification code information for additional processing, and/or receive workflow information from a separate source. For example, the apparatus may communicate with a server over a network in order to facilitate identification code recognition, receipt of workflow information, and/or for the processing or storage of additional information. The output component may be a display, a speaker, a mechanical response (such as a vibration), or any other output perceivable by the user's senses.

In some embodiments, the disclosure may be implemented through a server. The server may comprise memory having at least one database capable of storing and organizing company information, a communication component to transmit and receive data, and a processor to operate the server. Company information may include data relating to employees, identification codes, projects, workflow applications, work orders, inventory, equipment, and other information. The communication component may receive data regarding one or more identification codes, work order updates, and/or other inquiries. For example, the communication component may receive an inquiry for additional details regarding an identified step or item. The communication component may also transmit data received by the server or stored in the server memory. The processor may further analyze received data and/or data stored in the server memory. For example, the processor may receive identification code data from a networked source and compare the identification code data to the database containing identification code data in server memory. For another example, the processor may aggregate data relating to work order status received from multiple networked sources and the server memory to evaluate an overall project status. The processor may further output information received, stored in the server memory, and/or developed through analysis to an attached display or sensory output, and/or may output the information through transmission to another device using the communication component.

In some embodiments, a system implements the disclosure through a variety of components. For example, the system may comprise at least one scanning device in communication with at least one central computing unit. The scanning device may be a smart phone that utilizes a camera as a scanning component. The scanning device includes a display, and/or other output, a communication component and a user interface. The scanning device operates to provide output to a user and allow the user to input information. For example, the scanning device allows the user to input an identification code using a camera and depicts an electronic work order to the user via a display. The scanning device is part of a network including at least one central computing unit.

The central computing unit may be a server, a mobile device, a tablet or any other computing device used as a central computer for the system. The central computing unit includes at least a memory component, a communication component, and a processing component. The memory component may store historical company information, such as employee work orders, employee analytics, and/or project information, and may store information received from or based upon data from one or more scanning devices. The communication component transmits and receives data from at least one scanning device. In some embodiments, the system may further include additional computing devices, which may access and/or receive data from the central computing unit and/or the scanning devices. In some embodiments, these additional computing devices may be used to monitor data from the central computing unit and/or the scanning devices. In some embodiments, the additional computing devices may aggregate and/or analyze the available data for reporting and analytics. For example, the additional computing device may aggregate status of steps relating to project A. Based upon the status and additional scheduling considerations, the additional computing device may evaluate an estimated time of delivery for project A. The additional computing device may also utilize employee analytics to develop work orders for specific purposes, such as efficiency and/or quality.

In some system embodiments, the scanning device(s) may operate as data gathering and/or display components, while a networked server or central computing unit operates the application processing. For example, a scanning device may be capable of scanning, receiving a user input, and/or displaying received information. In such an embodiment, the device would operate to receive information, such as an identification code image and/or a step selection, and transmit that information to the networked server for additional processing. For example, the scanning device would display an image of options provided by the networked server, receive a selection from the user interface, and transmit that user input to the networked server. Based upon the user input, the networked server may determine the selected step and send an updated image for the scanning device to display to the user. One skilled in the art will recognize that the amount of processing conducted by the scanning device (s), server(s) and/or other components of the system may vary and remain within the scope and spirit of the present disclosure.

Some embodiments provide for the implementation of a method of the disclosure. The method for activity monitoring may comprise associating a scanning device with a user; identifying an electronic work order for the user to the associated scanning device; displaying an electronic work order; receiving a selection of a step displayed as part of the electronic work order; determining that the step selection indicates at least one of the step stopped or the step started; setting at least one of a stop time or a start time for the step; and posting a status update reflecting the status of the selected step to a database, wherein posting the update includes at least one of updating an existing work order entry in the database or creating a new work order entry in the database with the status update. The method may further include determining a completion status of the step. The process of associating a scanning device with the user may include scanning an identification code associated with the user. In some embodiments, receiving a selection may include receiving user interface commands indicative of the user selection. In some embodiments, the method may include altering the electronic work order display to reflect status updates. For example, icons displayed for steps in an electronic work order may change color with the status update to reflect the status of the given step. In some embodiments, displaying the electronic work order may include displaying step specific data associated with a selected step. In some embodiments, setting the stop or start time may include providing the user an opportunity to adjust the current time to reflect an actual start or stop time associated with the selected step. In some embodiments, posting of a status update may occur concurrently with other actions, and may operate in the background of a device. For example, once a step is selected the display may show an altered view of the electronic work order including information about the selected step, while the device simultaneously evaluates the availability of system access and updates a separate device database upon access availability.

Some embodiments of the disclosure are implemented using a tangible computer readable storage medium storing computer executable program code that, when executed by a processor, causes said computer executable program code to perform a method. The executed method may comprise associating a scanning device with a user; identifying an electronic work order for the user to the associated scanning device; displaying an electronic work order; receiving a selection of a step displayed as part of the electronic work order; determining that the step selection indicates at least one of the step stopped or the step started; setting at least one of a stop time or a start time for the step; and posting a status update reflecting the status of the selected step to a database, wherein posting the update includes at least one of updating an existing work order entry in the database or creating a new work order entry in the database with the status update.

The invention being thus described, it will be obvious that the same may be varied in many ways. Such variations are not to be regarded as a departure from the spirit and scope of the invention and all such modifications as would be obvious to one skilled in the art are intended to be included within the scope of the system, product, or method described.

The invention claimed is:

1. A system for management and monitoring of labor workflow comprising:
    a networked mobile scanning device comprising:
        a scanning component for registering codes, wherein said codes include a user identification code that is associated with a user and a workflow identification code associated with an electronic work order that is a manufacturing based work order and comprises a plurality of steps for said user, wherein said user identification code and said workflow identification code are separate codes,
        a user input for receiving input from said user,
        a display for providing visual output to said user,
        a network communication component for facilitating communication with a system network, and
        a processor operatively associated with said scanning component, said user input, said display and said network communication component;
    a networked server comprising:
        a database storing stored information,
        a server network communication component for facilitating communication with said system network, and
        a server processor operatively associated with said database and said server network communication component;
    wherein said networked mobile scanning device:
        determines said user by registering said user identification code with said scanning component and identifying said user associated with said user identification code,
        determines said electronic work order for said user by registering said workflow identification code with said scanning component and identifying said electronic work order associated with said workflow identification code,
        displays said electronic work order including said plurality of steps for said user that are within said electronic work order,
        receives a selection of one step of said plurality of steps by said user via said user input,
        identifies a time associated with said selection of said one step, and
        transmits a status update to said database, wherein said status update comprises data related to said electronic work order including said time; and
    wherein said networked server:
        receives said status update, and
        determines a labor workflow attribute for said user based upon an analysis of said data.

2. The system of claim 1 wherein said scanning component comprises a camera.

3. The system of claim 1 wherein said networked scanning device comprises a touch-screen display which operates as said user input and said display.

4. The system of claim 1 wherein said user identification code comprises a QR code associated with an employee badge.

5. The system of claim 1 wherein said workflow identification code comprises a QR code associated with a work order.

6. The system of claim 1 comprising a plurality of said networked scanning devices, wherein each of said plurality of said networked scanning devices transmits said status update to said database, and wherein said networked server aggregates information from said plurality of said networked scanning devices based upon said status updates.

7. The system of claim 1 wherein said networked server receives a plurality of said status updates for said work order for said user, aggregates said data from each of said plurality of status updates and determines said labor workflow attribute based upon the aggregation of said data, wherein said labor workflow attribute comprises an amount of time for said user to complete said one step.

8. The system of claim 7 wherein said networked server further analyses historical data associated with said user to determine labor workflow characteristics associated with said user.

9. The system of claim 7 wherein said networked server creates a user report based upon said labor workflow attribute of said user.

10. A method for workflow management and monitoring comprising the steps of:
    registering a user identification code with a scanning device;
    associating said scanning device with a user based upon said user identification code;
    registering a workflow identification code with said scanning device, wherein said user identification code and said workflow identification code are separate codes;
    determining an electronic work order based upon said workflow identification code, wherein said electronic work order is a manufacturing based work order and comprises a plurality of steps associated with said electronic work order;
    displaying said electronic work order on said scanning device;
    receiving a selection of at least one step of said plurality of steps associated with said electronic work order, wherein said selection is received from said user via operation of a user interface associated with said scanning device;
    identifying a time associated with said selection of said step; and
    transmitting a status update related to said electronic work order over a communication network to a server database.

11. The method of claim 10 wherein said scanning device is a mobile device.

12. The method of claim 10 wherein said registering comprises optical recognition of a visual code.

13. The method of claim 12 wherein said associating comprises analyzing said visual code with a user identification source to verify said visual code corresponds with at least one said user identification code, and associate said user with said visual code.

14. The method of claim 12 wherein said determining comprises analyzing said visual code with a work order identification source to verify said visual code corresponds with at least one said work order identification code.

15. The method of claim 10 wherein each of said plurality of said steps is displayed as an icon.

16. The method of claim 15 wherein each said icon represents a current status of said step; and said displaying includes changing the display of said icon based upon at least one of said selection and said status update.

17. The method of claim 10 wherein said user interface is a touch screen display.

18. The method of claim 10 further comprising the step of transmitting work flow information related to said electronic work order over said communication network to said server database.

19. The method of claim 18 further comprising the step of analyzing said work flow information to determine an attribute associated with at least one of said user and said electronic work order.

20. A system for management and monitoring of labor workflow comprising:
a plurality of networked mobile scanning devices, each comprising:
a scanning component for registering a user identification code that is associated with a user and a workflow identification code associated with an electronic work order comprising a plurality of steps of a manufacturing process for said user, wherein said user identification code and said workflow identification code are separate codes,
a user input for receiving input from said user,
a display for providing visual output to said user,
a network communication component for facilitating communication with a system network, and
a processor operatively associated with said scanning component, said user input, said display and said network communication component;
a networked server comprising:
a database storing labor workflow information,
a server network communication component for facilitating communication with said system network, and
a server processor operatively associated with said database and said server network communication component;
wherein each said networked mobile scanning device:
determines said user by registering said user identification code with said scanning component and identifying said user associated with said user identification code,
determines said electronic work order for said user by registering said workflow identification code with said scanning component and identifying said electronic work order associated with said workflow identification code,
displays said electronic work order including said plurality of steps for said user that are within said electronic work order,
receives a first selection of one step of said plurality of steps by said user via said user input,
identifies a start time associated with said first selection of said one step,
receives a second selection of said one step by said user via said user input,
identifies a stop time associated with said second selection of said one step, and
transmits a status update to said database, wherein said status update comprises data related to said electronic work order; and
wherein said networked server:
receives said status update from each of said plurality of networked mobile scanning devices,
determines a labor workflow attribute for each said user based upon an analysis of said data from the networked mobile scanning device associated with said user by the user identification code,
determines a placement of each said user based upon an evaluation of said labor workflow attribute for each said user, and
assigns a future electronic work order to said user based upon the placement of said user.

* * * * *